(12) United States Patent
Fukuzono et al.

(10) Patent No.: US 12,323,201 B2
(45) Date of Patent: Jun. 3, 2025

(54) WIRELESS COMMUNICATION SYSTEM, WIRELESS COMMUNICATION METHOD, AND RECEIVING DEVICE

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Masafumi Yoshioka, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 119 days.

(21) Appl. No.: 18/036,315

(22) PCT Filed: Nov. 12, 2020

(86) PCT No.: PCT/JP2020/042306
§ 371 (c)(1),
(2) Date: May 10, 2023

(87) PCT Pub. No.: WO2022/102063
PCT Pub. Date: May 19, 2022

(65) Prior Publication Data
US 2023/0421210 A1 Dec. 28, 2023

(51) Int. Cl.
*H04K 1/10* (2006.01)
*H04B 7/0413* (2017.01)
(Continued)

(52) U.S. Cl.
CPC ..... *H04B 7/0413* (2013.01); *H04L 25/03006* (2013.01)

(58) Field of Classification Search
CPC ............ H04B 7/0413; H04L 25/03006; H04L 25/0204
(Continued)

(56) References Cited

U.S. PATENT DOCUMENTS

| 2007/0286303 | A1* | 12/2007 | Yamaura | ............. H04L 25/0204 |
| | | | | 375/267 |
| 2012/0031480 | A1 | 2/2012 | Tisler | |
| 2022/0149898 | A1 | 5/2022 | Kuriyama et al. | |

FOREIGN PATENT DOCUMENTS

| JP | 2012-005137 A | 1/2012 |
| JP | 2020-141173 A | 9/2020 |

OTHER PUBLICATIONS

Hayato Fukuzono, Keita Kuriyama, Masafumi Yoshioka, Takafumi Hayashi, "A Spatial Diversity Technique Based on FIR-Transmit Beamforming on Multiuser MIMO-SC Systems", IEICE General Convention B-5-163, Mar. 2020.
(Continued)

*Primary Examiner* — Phuong Phu
(74) *Attorney, Agent, or Firm* — Harness, Dickey & Pierce, P.L.C.

(57) ABSTRACT

A transmission device includes a training signal generation unit that generates a predetermined existing signal used for a receiving device to estimate a communication channel response and a transmission beam-forming unit that forms a transmission beam for removing interstream interference with a transmission weight calculated based on the communication channel response estimated by the receiving device. The receiving device includes a communication channel estimation unit that receives the existing signal and estimates a communication channel response, a combination unit that combines a plurality of communication channel responses for each stream estimated with the existing signal from which the interstream interference has been removed,
(Continued)

and an equalization unit that performs an equalization process of removing intersymbol interference for each stream with the reception weight calculated based on the communication channel responses combined by the combination unit.

8 Claims, 7 Drawing Sheets

(51) Int. Cl.
H04L 25/03 (2006.01)
H04L 27/28 (2006.01)

(58) Field of Classification Search
USPC ............... 375/260, 267, 299, 346, 347, 348
See application file for complete search history.

(56) References Cited

OTHER PUBLICATIONS

Hayato Fukuzono, Keita Kuriyama, Masafumi Yoshioka, Tsutomu Tatsuta, "An Adaptive CP-Length Scheme on Multiuser MIMO-SC-FDE Systems with FIR-Transmit Beamforming", IEICE Society Convention B-5-62, Sep. 2019.

* cited by examiner (EXAMPLE OF DELAY PROFILE)

WIRELESS COMMUNICATION SYSTEM, WIRELESS COMMUNICATION METHOD, AND RECEIVING DEVICE

CROSS-REFERENCE TO RELATED APPLICATIONS

This application is a 371 U.S. National Phase of International Application No. PCT/JP2020/042306, filed on Nov. 12, 2020. The entire disclosure of the above application is incorporated herein by reference.

TECHNICAL FIELD

The present invention relates to a technology for improving accuracy of an estimation result of a communication channel response in a wireless communication system of a single carrier (SC)-multiple-input multiple-output (MIMO) scheme that performs a finite impulse response (FIR) type transmission beam-forming process.

BACKGROUND ART

When wideband SC-MIMO transmission is performed in a communication environment in which there is frequency selective fading, it is necessary to remove interstream interference caused due to spatial expansion of a plurality of antennas and remove intersymbol interference caused due to temporal expansion of communication channel characteristics.

In general MIMO transmission, at least one of a transmission device and a receiving device performs a transmission beam-forming process to remove interstream interference and a waveform equalization process to remove intersymbol interference in a frequency domain or a time domain.

For example, a communication system of a multiuser MIMO-SC-frequency domain equalization (FDE) system that performs an FIR type transmission beam-forming process is disclosed (see, for example, Non Patent Literature 1).

An FIR type transmission beam-forming method that can be used for a system of a non-square MIMO communication channel matrix in which the number of transmission antennas and the number of reception antennas are different has been studied (see, for example, Non Patent Literature 2).

CITATION LIST

Non Patent Literature

Non Patent Literature 1: Hayato Fukuzono, Keita Kuriyama, Masafumi Yoshioka, Tsutomu Tatsuta, "An Adaptive CP-Length Scheme on Multiuser MIMO-SC-FDE Systems with FIR-Transmit Beamforming," IEICE Society Convention B-5-62, September 2019.

Non Patent Literature 2: Hayato Fukuzono, Keita Kuriyama, Masafumi Yoshioka, Takafumi Hayashi, "A Spatial Diversity Technique Based on FIR-Transmit Beamforming on Multiuser MIMO-SC Systems," IEICE General Convention B-5-163, March 2020.

SUMMARY OF INVENTION

Technical Problem

In the related art, an inverse matrix of a communication channel matrix $H(z)$ is represented by a transposed cofactor matrix ($adj[H(z)]$) and a determinant ($det[H(z)]$), the transmission device performs a transmission beam-forming process with a transmission weight using $adj[H(z)]$, and the communication channel matrix is diagonalized. On a receiving device side, an equalization process is performed with a reception weight using $det[H(z)]$. For example, in the case of FDE, the equalization process is performed by dividing a received signal in a frequency domain by $det[H(z)]$ converted into the frequency domain. Here, in order to improve accuracy of the equalization process, it is necessary to increase accuracy of an estimation result of a communication channel response as highly as possible.

An objective of the present invention is to provide a wireless communication system, a wireless communication method, and a receiving device capable of improving accuracy of an estimation result of a communication channel response.

Solution to Problem

According to an aspect of the present invention, a wireless communication system performs wireless communication between a transmission device and a receiving device in conformity with an SC-MIMO scheme wherein the transmission device includes a training signal generation unit that generates a predetermined existing signal used for the receiving device to estimate a communication channel response, and a transmission beam-forming unit that forms a transmission beam for removing interstream interference with a transmission weight calculated based on the communication channel response estimated by the receiving device. The receiving device includes a communication channel estimation unit that receives the existing signal and estimates a communication channel response, a combination unit that combines a plurality of communication channel responses for each stream estimated with the existing signal from which the interstream interference has been removed, and an equalization unit that performs an equalization process of removing intersymbol interference for each stream with the reception weight calculated based on the communication channel responses combined by the combination unit.

According to another aspect of the present invention, there is provided a wireless communication method of performing wireless communication between a transmission device and a receiving device in conformity with an SC-MIMO scheme wherein the transmission device performs a training signal generation process of generating a predetermined existing signal used for the receiving device to estimate a communication channel response and a transmission beam-forming process of forming a transmission beam for removing interstream interference with a transmission weight calculated based on the communication channel response estimated by the receiving device. The receiving device performs a communication channel estimation process of receiving the existing signal and estimating a communication channel response, a combination process of combining a plurality of communication channel responses for each stream estimated with the existing signal from which the interstream interference has been removed, and an equalization process of removing intersymbol interference for each stream with the reception weight calculated based on the communication channel responses combined in the combination process.

According to still another aspect of the present invention, a receiving device performs wireless communication with a transmission device in conformity with an SC-MIMO scheme, the receiving device includes a communication channel estimation unit configured to receive a predetermined existing signal used for estimating a communication channel response transmitted from the transmission device and estimates the communication channel response; a combination unit configured to combine a plurality of communication channel responses for each stream estimated by an existing signal from which interstream interference transmitted by beam-forming from the transmission device has been removed; and an equalization unit configured to perform an equalization process of removing intersymbol interference for each stream with a reception weight calculated based on the communication channel responses combined by the combination unit.

Advantageous Effects of Invention

The wireless communication system, the wireless communication method, and the receiving device according to the present invention combine estimation results of communication channel responses for streams in an SC-MIMO system that performs an FIR type transmission beam-forming process and perform an equalization process on received signals of the streams based on the combined estimation results of the communication channel responses. Thus, it is possible to improve accuracy of the estimation results of the communication channel responses.

DESCRIPTION OF EMBODIMENTS

Hereinafter, embodiments of a wireless communication system, a wireless communication method, and a receiving device according to the present invention will be described with reference to the drawings.

Figure 1:
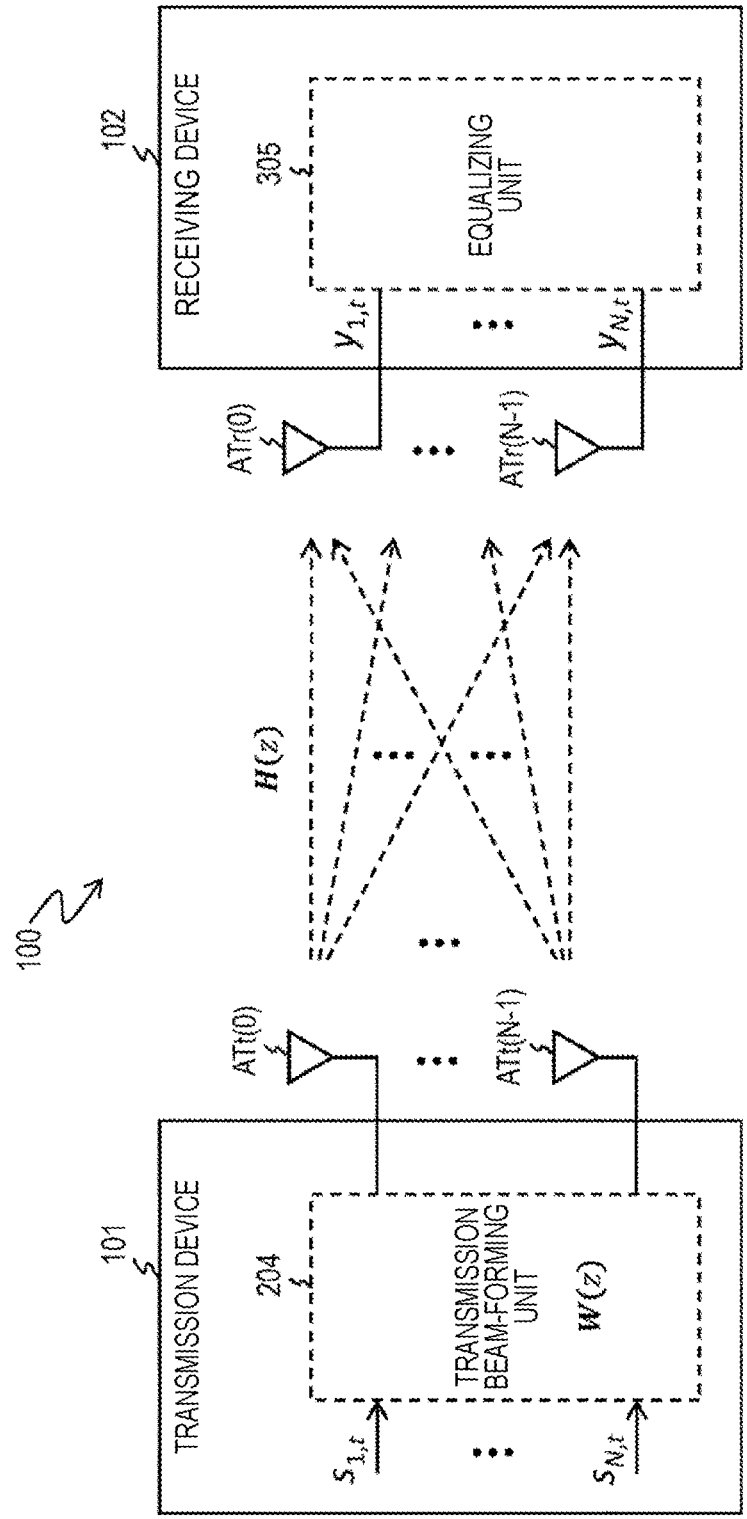
FIG. 1 is a diagram illustrating an example of a wireless communication system according to an embodiment.

FIG. 1 illustrates an example of a wireless communication system 100 according to an embodiment. In FIG. 1, the wireless communication system 100 includes a transmission device 101 that has N (where N is a positive integer) antennas from an antenna ATt(0) to an antenna ATt(N−1) and a receiving device 102 that has N antennas from an antenna ATr(0) to an antenna ATr(N−1), and performs communication between the transmission device 101 and the receiving device 102 in conformity with the SC-MIMO scheme.

When common features of the antenna ATt(0) to the antenna ATt(N−1) are described, hey will be referred to as the antenna ATt with the (number) at the end of a the reference numeral omitted. When a plurality of the same blocks are arranged in parallel, the antenna ATr and other blocks to be described below are also described in the same manner as the antenna ATt.

In FIG. 1, the transmission device 101 includes N antennas ATt(0) to ATt(N−1) and a transmission beam-forming unit 204. In the transmission device 101 illustrated in FIG. 1, components other than the transmission beam-forming unit 204, such as a block generating a training signal for estimating a communication channel response on the receiving device 102 side, are omitted, and these components will be described below in detail.

The transmission beam-forming unit 204 inputs a signal for each stream corresponding to the N antennas ATt and, for example, performs an FIR type transmission beam-forming process in the time domain. The signal of each stream from which the interstream interference has been removed by the transmission beam-forming process is transmitted from each of the N antennas ATt. Specifically, the transmission beam-forming unit 204 inputs N signals from a stream $s_{1,t}$ to a stream $s_{N,t}$ and performs the transmission beam-forming process using a transmission weight W(z). The signals of the N streams on which the transmission beam-forming process has been performed are transmitted from the N antennas ATt. The transmission weight W(z) will be described below. A process of adding a cyclic prefix (CP) to the signal of each stream input by the transmission beam-forming unit 204 is appropriately performed.

The receiving device 102 includes the N antennas ATr(0) to ATr(N−1), and an equalization unit 305. In the receiving device 102 illustrated in FIG. 1, for example, components other than the equalization unit 305, such as a block that estimates a communication channel response based on a training signal transmitted from the transmission device 101, are omitted, and these components will be described in detail below.

The equalization unit 305 receives signals transmitted from the transmission device 101 through N antennas ATr and performs an equalization process to remove intersymbol interference from the signal of each stream received by each antenna ATr. Specifically, the equalization unit 305 inputs N signals from $y_{1,t}$ to $y_{N,t}$ received through the N antennas ATr and performs an equalization process with a reception weight in order to remove the intersymbol interference from each signal. The reception weight will be described below. Furthermore, when the equalization process of FDE is performed, the CP added on the side of the transmission device 101 is removed from the signal input to the equalization unit 305.

Here, in the communication channel between the antennas ATt(0) to ATt(N−1) of the transmission device 101 and the antennas ATr(0) to ATr(N−1) of the receiving device 102, there are not only direct waves between the antennas but also multipaths with various delay times. A communication channel response between the antennas ATt(0) to ATt(N−1) of the transmission device 101 and the antennas ATr(0) to ATr(N−1) of the receiving device 102 is represented by a communication channel matrix H(z).

Figure 2:
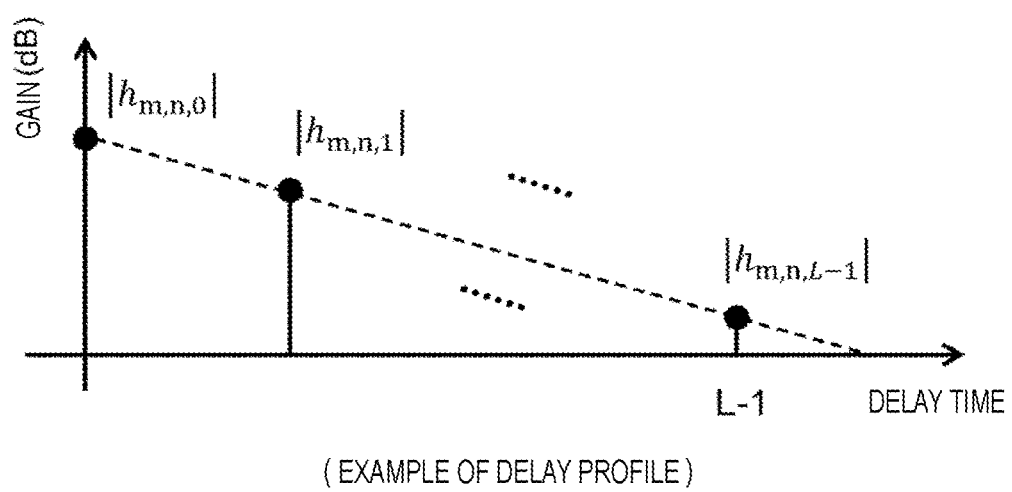
FIG. 2 is a diagram illustrating an example of a delay profile.

FIG. 2 illustrates an example of a delay profile. The delay profile in FIG. 2 is a delay profile between antenna ATt(n) (where n is an integer from 0 to N−1) of the transmission device 101 and an antenna ATr(m) (where m is an integer from 0 to N−1) of the receiving device 102. In FIG. 2, the horizontal axis represents a delay time 1, and the vertical axis represents a gain (dB) of a delay wave. ATt(n) indicates one of the N antennas ATt of the transmission device 101, and ATr(m) indicates one of the N antennas ATr of the receiving device 102. L (where is L is a positive integer) represents a CIR length of a delay wave with a maximum delay in a communication channel response (a channel impulse response (CIR)). Here, 0, 1, ..., L−1 of the delay time illustrated in (a) of FIG. 1 correspond to degrees of a delay operator to be described below.

In FIG. 2, $|h_{m,n,0}|$ indicates a gain (dB) of a delay time of degree 0. Similarly, $|h_{m,n,L-1}|$ indicates a gain of a delay time of degree 1, and $|h_{m,n,L-1}|$ indicates a gain of a delay time of degree (L−1).

Here, a communication channel response ($H_{m,n}(z)$) between the antenna ATt(n) of the transmission device 101 and the antenna ATr(m) of the receiving device 102 is expressed by Expression (1). In Expression (1), z of $z^{-1}$ is a delay operator that performs a time shift.

[Math. 1]

$$H_{m,n}(z) = \sum_{l=0}^{L-1} h_{m,n,l} z^{-l} \quad (1)$$

The communication channel response in the MIMO communication channel between the transmission device 101 including N antennas ATt and the receiving device 102 including N antennas ATr is expressed by a communication channel matrix H(z) that has N×N communication channel responses between the antennas in Expression (1) as elements, as expressed by Expression (2).

[Math. 2]

$$H(z) = \begin{bmatrix} H_{0,0}(z) & H_{0,1}(z) & \cdots \\ H_{1,0}(z) & \square & \square \\ \vdots & \square & \square \end{bmatrix} \quad (2)$$

Here, an inverse matrix of H(z) is expressed by Expression (3) when a transposed cofactor matrix is expressed as adj[H(z)] and a determinant is expressed as det[H(z)]. Here, in the expression (3) and the following expressions, |H(z)| represents det[H(z)].

[Math. 3]

$$H(z)^{-1} = \frac{1}{|H(z)|} adj[H(z)] \quad (3)$$

Here, an adjugate matrix (adj) is different from an adjoint matrix that represents a Hermitian transpose.

In this way, it is known that the communication channel matrix H(z) is diagonalized using the transposed cofactor matrix adj[H(z)] as the transmission weight W(z) of the transmission beam-forming process, and each diagonal element is equal to det[H(z)] (see, for example, Non Patent Literature 1).

When the transmission beam-forming process is performed using adj[H(z)] as the transmission weight W(z), the communication channel matrix is equivalently expressed by Expression (4). Here, I is a unit matrix.

[Math. 4]

$$H(z)W(z) = |H(z)|I \quad (4)$$

$$= \begin{bmatrix} |H(z)| & 0 & \cdots & 0 \\ 0 & \ddots & \ddots & \vdots \\ \vdots & \ddots & \ddots & 0 \\ 0 & \cdots & 0 & |H(z)| \end{bmatrix}$$

In this way, by performing the transmission beam-forming process using adj[H(z)] as the transmission weight W(z), the communication channel matrix H(z) is diagonalized, non-diagonal components representing the interstream interference component become 0, and the interstream interference is removed.

Here, in the related art, the intersymbol interference of the reception signal of each stream is removed by performing the equalization process using det[H(z)] on the data signal from which the interstream interference has been removed. However, in order to improve accuracy of the equalization process, it is necessary to raise accuracy of the estimation result of the communication channel response as highly as possible.

Accordingly, in the embodiment, the accuracy of the estimation result of the communication channel response is improved by focusing on the fact that the communication channel matrix is diagonalized through the above-described transmission beam-forming process and the same reception weight is used in a plurality of streams.

The wireless communication system 100 according to the embodiment estimates each of the channel communication matrices H(z) of a plurality of streams after the removal of interstream interference, and combines the plurality of estimated channel matrices H(z). Thus, it is possible to improve the accuracy of the estimation result of the communication channel response. Then, the accuracy of the equalization process is improved by calculating the reception weight from the combined communication channel response ^H(z).

(Combination Process)

Next, a combination process for estimation results of communication channel responses in the wireless communication system 100 according to the embodiment will be described.

In FIG. 1, for N streams at time t, when transmission signals are $s_{1,t}$ to $s_{N,t}$, noise is $w_{1,t}$ to $w_{N,t}$, a communication channel matrix is H(z), and a transmission beam-forming weight is W(z), the reception signals $y_{1,t}$ to $y_{N,t}$ of streams are expressed by Expression (5).

[Math. 5]

$$\begin{bmatrix} y_{1,t} \\ \vdots \\ y_{N,t} \end{bmatrix} = H(z)W(z) \begin{bmatrix} s_{1,t} \\ \vdots \\ s_{N,t} \end{bmatrix} + \begin{bmatrix} \omega_{1,t} \\ \vdots \\ \omega_{N,t} \end{bmatrix} \quad (5)$$

Here, the communication channel matrix after the removal of the interstream interference is expressed as a communication channel matrix $H_W(z)$ of each stream by Expression (6). Expression (6) corresponds to Expression (4) described above.

[Math. 6]

$$H(z)W(z) = \begin{bmatrix} H_W(z) & 0 & 0 \\ 0 & \ddots & 0 \\ 0 & 0 & H_W(z) \end{bmatrix} \quad (6)$$

In Expression (6), $H_W(z)$ is the same in all the streams. That is, it is conceivable that the received signals $y_{1,t}$ to $y_{N,t}$ after the interstream interference removal virtually perform independent SISO transmission in each stream, as shown in Expression (7), and the communication channel matrices of the streams at this time are the same $H_W(z)$.

[Math. 7]

$$\begin{cases} y_{1,t} = H_W(z)s_{1,t} + \omega_{1,t} \\ \vdots \\ y_{N,t} = H_W(z)s_{N,t} + \omega_{N,t} \end{cases} \quad (7)$$

In the embodiment, in consideration of this point, the communication channel matrices $H_{0,0}(z)$, $H_{1,1}(z)$, $H_{2,2}(z)$, ..., $H_{N-1,N-1}(z)$ of the streams are estimated using $s_{1,t}$ to $s_{N,t}$ as a predetermined existing signals (training signals). Then, a combined communication channel response $\hat{H}_W(z)$ obtained by combining the communication channel matrices of the estimated N streams is calculated. Then, the combined communication channel response $\hat{H}_W(z)$ is used as $H_W(z)$ in Expressions (6) and (7).

Here, $H_{0,0}(z)$ indicates a communication channel response between the antennas ATt(0) and ATr(0). Similarly, the communication channel matrix $H_{1,1}(z)$ indicates a communication channel response between the antennas ATt(1) and ATr(1), $H_{2,2}(z)$ indicates a communication channel response between the antennas ATt(2) and ATr(2), and $H_{N-1,N-1}(z)$ indicates a communication channel response between the antennas ATt(N−1) and ATr(N−1).

By performing the process of combining the plurality of estimated channel matrices in this way, noise, a variation, or the like is removed, and the accuracy of the estimation result of the communication channel response is improved.

In the combination of the plurality of estimated communication channel responses, for example, as shown in Expression (8), an average value obtained by averaging the estimation results of the communication channel responses of the plurality of streams can be used as a combined communication channel response $\hat{H}_W(z)$.

[Math. 8]

$$\hat{H}_W(z) = \frac{\hat{H}_{1,W}(z) + \ldots + \hat{H}_{N,W}(z)}{N} \quad (8)$$

In Expression (8), the estimated channel matrices $\hat{H}_{1,W}(z)$ are estimated values corresponding to the communication channel matrices $H_{1,1}(z)$, the estimated channel matrices $\hat{H}_{2,W}(z)$ are estimated values respectively corresponding to the communication channel matrices $H_{2,2}(z)$, and the estimated channel matrices $\hat{H}_{N-1,W}(z)$ are estimated values respectively corresponding to the communication channel matrices $H_{N-1,N-1}(z)$.

Then, the above-described Expression (7) can be expressed as Expression (9) by using the combined communication channel response $\hat{H}_W(z)$.

[Math. 9]

$$\begin{cases} y_{1,t} = \hat{H}_W(z)s_{1,t} + \omega_{1,t} \\ \vdots \\ y_{N,t} = \hat{H}_W(z)s_{N,t} + \omega_{N,t} \end{cases} \quad (9)$$

In this way, since the wireless communication system 100 according to the embodiment uses the highly accurate combined communication channel response $\hat{H}_W(z)$, the accuracy of the equalization process is improved. The reception weight is $1/\hat{H}_W(z)$ using the combined communication channel response $\hat{H}_W(z)$.

Here, in the above description, an average value obtained by simply averaging the estimation results of the communication channel responses of the plurality of streams is set as the combined communication channel response $\hat{H}_W(z)$, but a combined value may be obtained by well-known statistical processing. Alternatively, weighting may be performed according to a state of each stream or a process of excluding a maximum value and a minimum value of the N estimated values, for example, may be performed.

In the above description, the communication channel matrix of square MIMO in which the number of antennas of the transmission device 101 is the same as the number of antennas of the receiving device 102 has been described, but the present invention can be similarly applied to a communication channel matrix of non-square MIMO in which the number of antennas of the transmission device 101 is different from the number of antennas of the receiving device 102. For example, in the case of a communication channel matrix of non-square MIMO, as described in Non Patent Literature 2, a transmission weight can be generated with a transposed cofactor matrix adj[Y(z)] of a communication channel matrix H(z) and a product Y(z) (substantially equal to $H(z)H(z)^H$) of complex conjugate transpose of the communication channel matrix H(z), and transmission beam-forming can be performed. Accordingly, H(z) can be diagonalized, and thus a process can be performed similarly on the previous embodiment. Specifically, the receiving device 102 can estimate the communication channel response of each stream after the transmission beam-forming using the training signal transmitted from the transmission device 101 and can perform the equalization process using the combined communication channel response $\hat{H}_W(z)$ obtained by combining the estimated communication channel responses of the plurality of streams.

In this way, even in the non-square MIMO communication, the accuracy of the estimation result of the communication channel response is improved, and thus a highly accurate equalization process can be performed.

Configuration Example of Transmission Device 101

Figure 3:
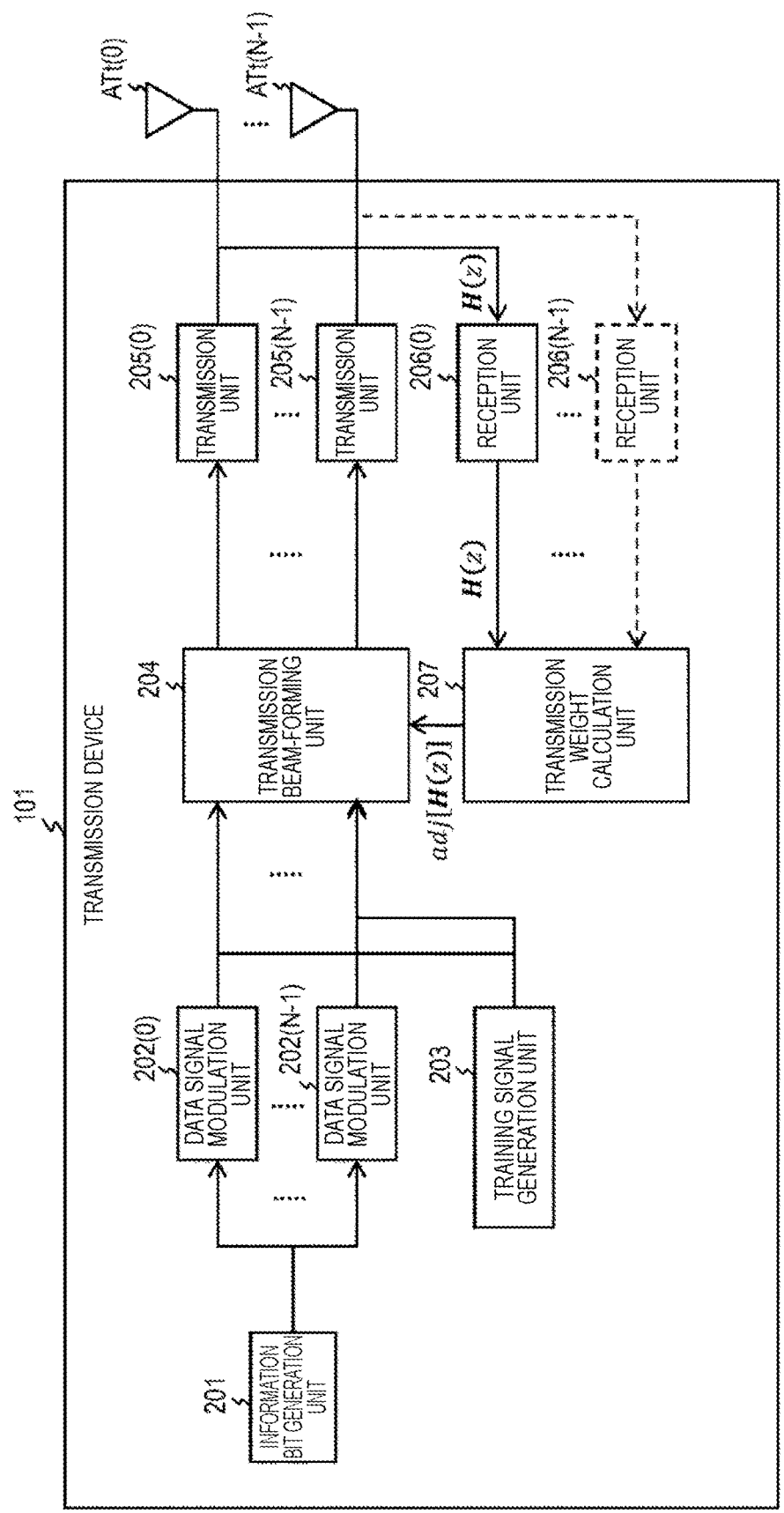
FIG. 3 is a diagram illustrating a configuration example of a transmission device according to the embodiment.

FIG. 3 illustrates a configuration example of the transmission device 101 according to the embodiment.

In FIG. 3, the transmission device 101 includes an information bit generation unit 201, a data signal modulation unit 202, a training signal generation unit 203, a transmission beam-forming unit 204, a transmission unit 205, a reception unit 206, a transmission weight calculation unit 207, and antennas ATt(0) to ATt(N−1). When the equalization process of FDE is performed on a reception side, a CP addition unit may be provided between the data signal modulation unit 202 and the transmission beam-forming unit 204.

The information bit generation unit 201 generates data information bits of N streams to be transmitted to the receiving device 102. The data information bits are, for example, a bit string corresponding to a data signal input from the outside (not illustrated), a data signal generated inside, or the like. The information bit generation unit 201 may have an error correction coding function that generates an error correction code at a predetermined coding rate, an interleaving function, and the like.

The data signal modulation unit 202 includes data signal modulation units 202(0) to 202(N−1) respectively corresponding to the N antennas ATt(0) to ATt(N−1). Each data signal modulation unit 202 outputs a data signal obtained by modulating the bit string of each stream output from the information bit generation unit 201 in conformity with a predetermined modulation scheme (for example, quadrature amplitude modulation (QAM) or the like).

The training signal generation unit 203 generates an existing signal (a training signal) for estimating a communication channel response between the transmission device 101 and the receiving device 102 (a training signal generation process). The training signal is a predetermined signal obtained by modulating predetermined information (for example, a specific pattern such as an alternate pattern of "01") such as a signal detection preamble in conformity with a modulation scheme that scarcely receives interference, such as phase shift keying (PSK), and is used for the receiving device 102 to estimate a communication channel response. Information regarding the training signal is known between the transmission device 101 and the receiving device 102.

The transmission beam-forming unit 204 uses a transmission weight adj[H(z)] calculated by a transmission weight calculation unit 207 to be described below to perform a transmission beam-forming process for removing interstream interference in N×N MIMO transmission on signals output from the N data signal modulation units 202. The transmission beam-forming unit 204 may have a function of normalizing transmission power.

The transmission unit 205 includes transmission units 205(0) to 205(N−1) respectively corresponding to the antennas ATt(0) to ATt(N−1). Each of the transmission units 205 includes a pulse shaping unit (performing necessary band limitation with a roll-off filter or the like), a digital-to-analog conversion (DAC), and a radio frequency (RF) unit and performs a process of converting a signal for each stream output from the transmission beam-forming unit 204 into a high frequency signal and transmitting the high frequency signal from the antenna ATt.

The reception unit 206 includes reception units 206(0) to 206(N−1) respectively corresponding to the antennas ATt(0) to ATt(N−1). Each of the reception units 206 includes an RF unit, an analog-to-digital conversion (ADC), and a pulse shaping unit and frequency-converts a high-frequency received signal received from each of the antennas ATt(0) to ATt(N−1) into a low-frequency baseband signal. In the example of FIG. 3, here, the reception unit 206 receives a signal including information regarding the communication channel matrix H(z) from the receiving device 102 and outputs the signal to the transmission weight calculation unit 207. The reception unit 206 or the transmission weight calculation unit 207 may have the function of a demodulation unit that demodulates the information regarding the communication channel matrix from the baseband signal. The signal including the information regarding the communication channel matrix H(z) may be received by any one reception unit 206 among the reception units 206(0) to 206(N−1) or may be received in parallel or in a distributed manner by the plurality of reception units 206.

The transmission weight calculation unit 207 calculates adj[H(z)] described in Expression (3) as the transmission weight W(z) based on the communication channel matrix H(z) estimated by the receiving device 102 (a weight calculating process). The calculated transmission weight is output to the transmission beam-forming unit 204.

In this way, the transmission device 101 transmits the training signal for estimating the communication channel response and receives the estimation result of the communication channel response between the N×N antennas as the communication channel matrix H(z) from the receiving device 102. Then, the transmission device 101 performs a transmission beam-forming process using adj[H(z)] calculated based on the communication channel matrix H(z) as a transmission weight to remove interstream interference.

In the example of FIG. 3, the transmission weight calculation unit 207 is provided in the transmission device 101, but the receiving device 102 may calculate the transmission weight and transmit the transmission weight to the transmission device 101. In this case, the reception unit 206 receives information regarding adj[H(z)] from the receiving device 102 and outputs the information to the transmission beam-forming unit 204.

Configuration Example of Receiving Device 102

Figure 4:
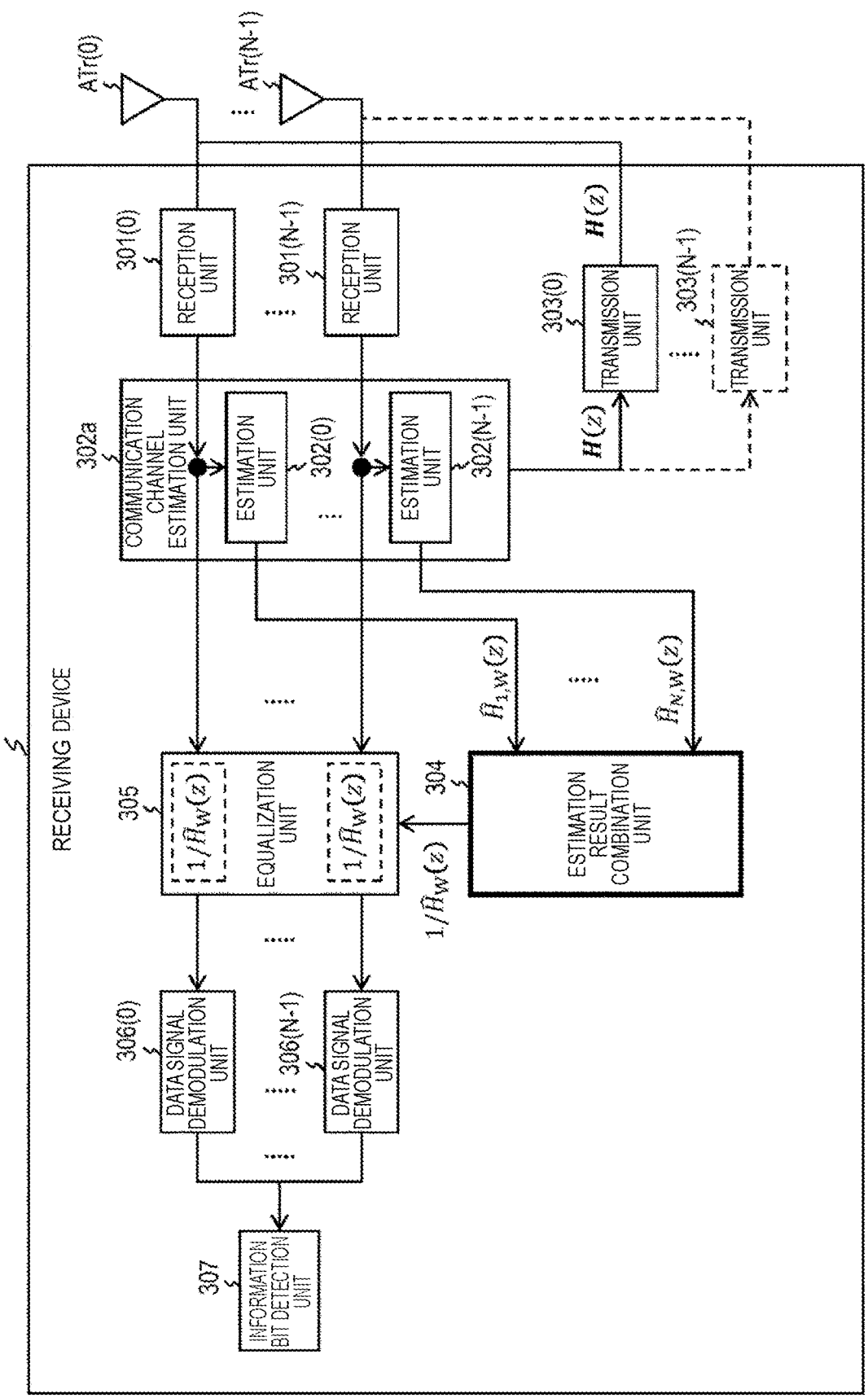
FIG. 4 is a diagram illustrating a configuration example of a receiving device according to the embodiment.

FIG. 4 illustrates a configuration example of the receiving device 102 according to the embodiment.

In FIG. 4, the receiving device 102 includes a reception unit 301, a communication channel estimation unit 302a, a transmission unit 303, an estimation result combination unit 304, an equalization unit 305, a data signal demodulation unit 306, an information bit detection unit 307, and antennas ATr(0) to ATr(N−1).

The reception unit 301 includes reception units 301(0) to 301(N−1) respectively corresponding to the antennas ATr(0) to ATr(N−1). Like the reception unit 206 of the transmission device 101, each of the reception units 301 includes an RF unit, an ADC unit, and a pulse shaping unit and frequency-converts a high-frequency signal received by the antenna ATr into a baseband signal.

The communication channel estimation unit 302a includes estimation units 302(0) to 302 (N−1) respectively corresponding to the antennas ATr(0) to ATr(N−1). Each estimation unit 302 estimates a communication channel response based on the training signal transmitted from the transmission device 101 (a communication channel estimation process). Here, the estimation unit 302 performs a first estimation process to calculate a transmission weight used by the transmission beam-forming unit 204 of the transmission device 101 and a second estimation process to calculate reception weight used by the equalization unit 305 of the receiving device 102. In the first estimation process, the communication channel responses between all the N×N antennas are estimated, and the communication channel matrix H(z) (the above-described Expression (2)) that has the N×N communication channel responses as elements is obtained. In the second estimation process, N communication channel responses $\hat{H}_{k,W}(z)$ (where k is an integer from 1 to N) are estimated for each stream. The details of a process of the communication channel estimation unit 302a will be described below.

The transmission unit 303 includes transmission units 303(0) to 303(N−1) respectively corresponding to the antennas ATr(0) to ATr(N−1). Like the transmission unit 205 of the transmission device 101, each transmission unit 303 includes a pulse forming unit, a DAC unit, and an RF unit and converts information regarding the communication channel matrix H(z) output from the communication channel estimation unit 302a and the like into a high-frequency signal and transmits the high-frequency signal from the antenna ATr. The transmission unit 303 or the communication channel estimation unit 302a may have the function of the modulation unit that modulates the information regarding the communication channel matrix H(z) into the baseband signal.

The estimation result combination unit 304 combines the estimation results of the communication channel responses ($\hat{H}_{1,W}(z)$ to $\hat{H}_{N,W}(z)$) for the N streams estimated by the estimation unit 302 in the second estimation process, and calculates a highly accurate combined communication channel response $\hat{H}_W(z)$. Then, $1/\hat{H}_W(z)$ is calculated as a reception weight based on the combined communication channel response $\hat{H}_W(z)$ and is output to the equalization unit 305 (a weight calculation process). The weight calculation process may be performed by the equalization unit 305. The combined communication channel response $\hat{H}_W(z)$ is calculated as an average value obtained by averaging the estimation results of the communication channel responses of the N streams, for example, as described in Expression (8).

The equalization unit 305 performs an equalization process to remove intersymbol interference of the data signal for each stream received by the reception unit 301 using $1/\hat{H}_W(z)$ as a reception weight of each stream based on the combined communication channel response $\hat{H}_W(z)$ output from the estimation result combination unit 304. Since the communication channel matrix is diagonalized through the transmission beam-forming process of the transmission device 101 and the diagonal elements are the same as each other as indicated in the above Expression (6), the same combined communication channel response $\hat{H}_W(z)$ is used for each stream of the reception unit 301(0) to the reception unit 301(N). Here, when the equalization process is performed by FDE, the equalization process is performed by dividing the data signal converted into the frequency domain through discrete Fourier transform (DFT) by the combined communication channel response $\hat{H}_W(z)$ converted into the frequency domain. The equalized frequency domain data signal is converted into a time domain data signal through inverse discrete Fourier transform (IDFT) to be output to the data signal demodulation unit 306.

The data signal demodulation unit 306 demodulates the data signal output from the equalization unit 305 into information bits and outputs a bit string. The data signal demodulation unit 306 may have an error correction decoding function or a deinterleaving function according to the function on the side of the transmission device 101.

The information bit detection unit 307 outputs received data obtained by converting the bit string output from the data signal demodulation unit 306 into digital data. An error correction decoding function and a deinterleaving function may be performed on the side of the information bit detection unit 307.

In this way, the receiving device 102 estimates the communication channel response for performing the transmission beam-forming process through the first estimation process, estimates the communication channel response for each stream for performing the equalization process through the second estimation process, and combines the estimation results. Accordingly, the accuracy of the estimation result of the communication channel response can be improved, and a highly accurate equalization process can be performed.

(Processing of Communication Channel Estimation Unit 302*a*)

As described above, the communication channel estimation unit 302*a* includes the N estimation units 302 and performs the first estimation process and the second estimation process for estimating the communication channel responses between the N antennas ATt and the N antennas ATr.

In the first estimation process, the N×N communication channel responses between all the N×N antennas are estimated, and the communication channel matrix H(z) that has the estimated N×N communication channel responses as elements is obtained. For example, the training signal is transmitted from the antenna ATt(0) of the transmission device 101, and the communication channel responses $H_{0,0}(z)$, $H_{0,1}(z)$, . . . , $H_{0,N-1}(z)$ when received by the antenna ATr(N−1) are estimated from the antenna ATr(0) of the receiving device 102. Similarly, the training signal is transmitted from the antenna ATt(1) of the transmission device 101, and the communication channel responses $H_{1,0}(z)$, $H_{1,1}(z)$, . . . , $H_{1,N-1}(z)$ at the time of reception from the antenna ATr(N−1) are estimated from the antenna ATr(0) of the receiving device 102. In this way, by sequentially transmitting the training signals from the antennas ATt of the antenna ATt(0) to the antenna ATt(N−1) of the transmission device 101, the communication channel responses between all the N×N antennas are estimated, and the communication channel matrix H(z) that has the N×N communication channel responses as elements is obtained. In the first estimation process, the antennas ATt other than the antenna ATt(0) do not transmit signals while the training signal is being transmitted from the antenna ATt(0) of the transmission device 101. Similarly, while the training signal is being transmitted from the antenna ATt(1), the antennas ATt other than the antenna ATt(1) do not transmit the signal. The same applies to the other antennas ATt.

Next, the second estimation process is a process of calculating the reception weight used by the equalization unit 305 of the receiving device 102 and is performed in a state where the transmission beam is formed based on the transmission weight obtained by the first estimation process. That is, in a state where the interstream interference is removed, the communication channel response ($\hat{H}_{1,W}(z)$ to $\hat{H}_{N,W}(z)$) for each of the N streams is estimated. For example, a training signal transmitted from the antenna ATt(0) of the transmission device 101 is received by the antenna ATr(0) of the receiving device 102, and the communication channel response $H_{0,0}(z)$ of the stream between the antennas ATt(0) and ATr(0) is estimated. Similarly, the training signal transmitted from the antenna ATt(1) of the transmission device 101 is received by the antenna ATr(1) of the receiving device 102, and the communication channel response $H_{1,1}(z)$ of the stream between the antennas ATt(1) and ATr(1) is estimated. In this way, the communication channel response ($H_{0,0}(z)$, $H_{1,1}(z)$, $H_{2,2}(z)$, . . . , $H_{N-2,N-2}(z)$, $H_{N-1,N-1}(z)$) for each stream between the antenna ATr(0) to antenna ATr(N−1) of the receiving device 102 having the same number as the antenna ATt(0) to the antenna ATt(N−1) of the transmission device 101 is estimated. Here, the estimated communication channel responses of the streams corresponding to the N $H_{0,0}(z)$, $H_{1,1}(z)$, $H_{2,2}(z)$, . . . , $H_{N-2,N-2}(z)$, and $H_{N-1,N-1}(z)$ will be described as $\hat{H}_{1,W}(z)$, $\hat{H}_{2,W}(z)$, $\hat{H}_{3,W}(z)$, . . . , $\hat{H}_{N-1,W}(z)$, and $\hat{H}_{N,W}(z)$. In the second estimation process, the interstream interference is removed. Therefore, the training signals may be simultaneously transmitted from N antennas ATt of the antenna ATt(0) to the antennas ATt(N−1) of the transmission device 101 to estimate the communication channel response of each stream.

In this way, the communication channel estimation unit 302*a* first performs the first estimation process to acquire the communication channel matrix H(z) for calculating the transmission weight used by the transmission beam-forming unit 204 of the transmission device 101, and then performs the second estimation process to estimate the communication channel response for each stream for calculating the reception weight used by the equalization unit 305 of the receiving device 102. Accordingly, in the wireless communication system 100 according to the embodiment, the transmission beam-forming unit 204 can remove the interstream interference and the equalization unit 305 can remove intersymbol interference. In particular, in the embodiment, since the estimation results of the communication channel responses obtained by estimating the reception weights used by the equalization unit 305 for the streams of the plurality of streams are combined, the accuracy of the estimation results of the communication channel responses can be enhanced.

Figure 5:
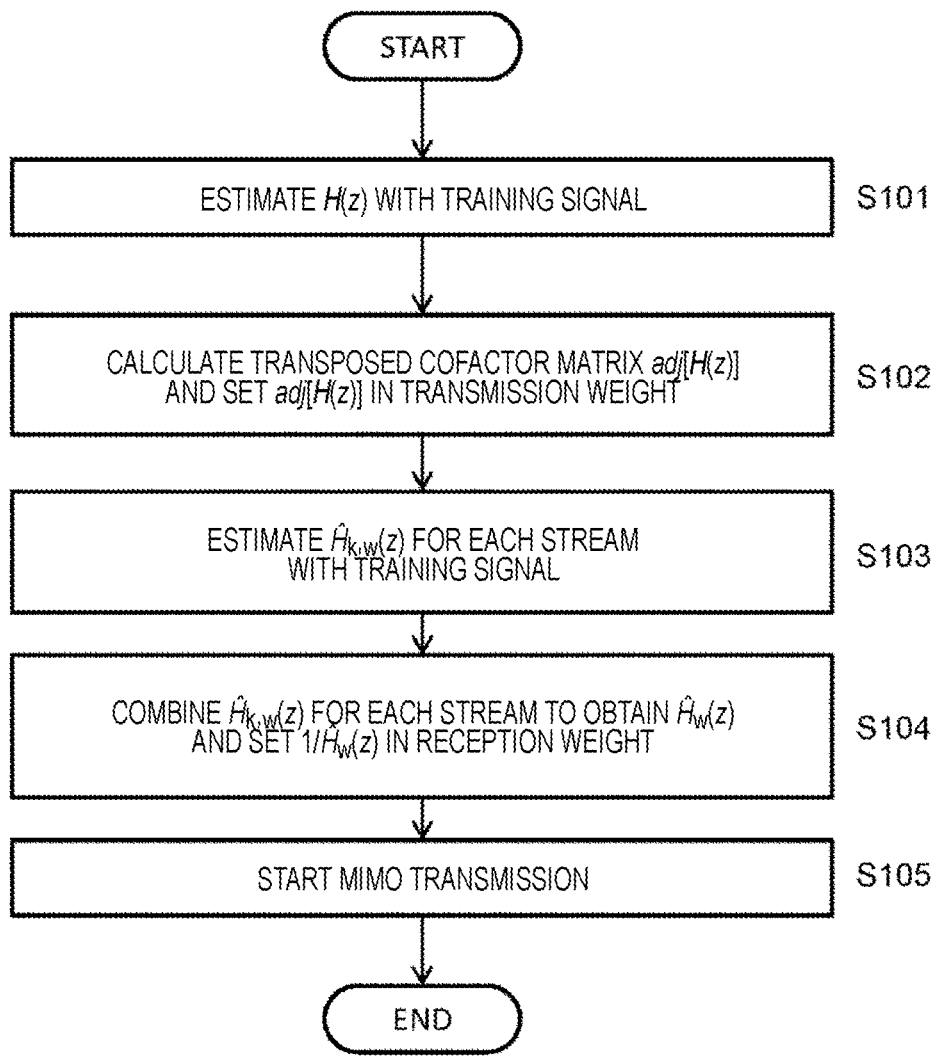
FIG. 5 is a diagram illustrating a flow of a process of the wireless communication system according to the embodiment.

FIG. 5 illustrates a flow of a process of the wireless communication system 100 according to the embodiment. The process illustrated in FIG. 5 is performed by each block of the transmission device 101 and the receiving device 102 described in FIGS. 3 and 4.

In step S101, the estimation unit 302 of the receiving device 102 receives the training signal transmitted from the transmission device 101 and estimates the communication channel matrix H(z) between all the antennas (the first estimation process). The estimated communication channel matrix H(z) is transmitted to the transmission device 101.

In step S102, the transmission weight calculation unit 207 of the transmission device 101 calculates the transposed cofactor matrix adj[H(z)] and sets adj[H(z)] in the transmission weight of the transmission beam-forming unit 204. Accordingly, the transmission device 101 can transmit the signal from which the interstream interference has been removed.

In step S103, the estimation unit 302 of the receiving device 102 receives the training signal transmitted from the transmission device 101 and estimates the communication channel response $\hat{H}_{k,W}(z)$ for each stream (the second estimation process). The estimated communication channel response $\hat{H}_{k,W}(z)$ for each stream is output to the estimation result combination unit 304.

In step S104, the estimation result combination unit 304 of the receiving device 102 combines the communication channel responses $\hat{H}_{k,W}(z)$ for each of the N streams output from the estimation unit 302 and calculates the combined communication channel response $\hat{H}_{W}(z)$. The combined communication channel response $\hat{H}_{W}(z)$ is calculated as an average value obtained by averaging the estimation results of the communication channel responses of the N streams, for example, as described in Expression (8). Then, $1/\hat{H}_{W}(z)$ is set in the reception weight of the equalization unit 305 based on the combined communication channel response $\hat{H}_{W}(z)$. Then, the equalization unit 305 performs an equalization process of removing intersymbol interference of each stream using $1/\hat{H}_{W}(z)$ as a reception weight.

In step S105, the transmission device 101 and the receiving device 102 start communication of the data signal by MIMO transmission in a state in which the interstream interference and the intersymbol interference are removed.

In this way, in conformity with the SC-MIMO scheme of performing the FIR type transmission beam-forming process, the wireless communication system 100 according to the embodiment combines the estimation results of the communication channel responses for the streams and performs the equalization process on the reception signals of the streams based on the combined estimation results of the communication channel responses. Thus, it is possible to improve the accuracy of the estimation results of the communication channel responses.

Comparative Example

Figure 6:
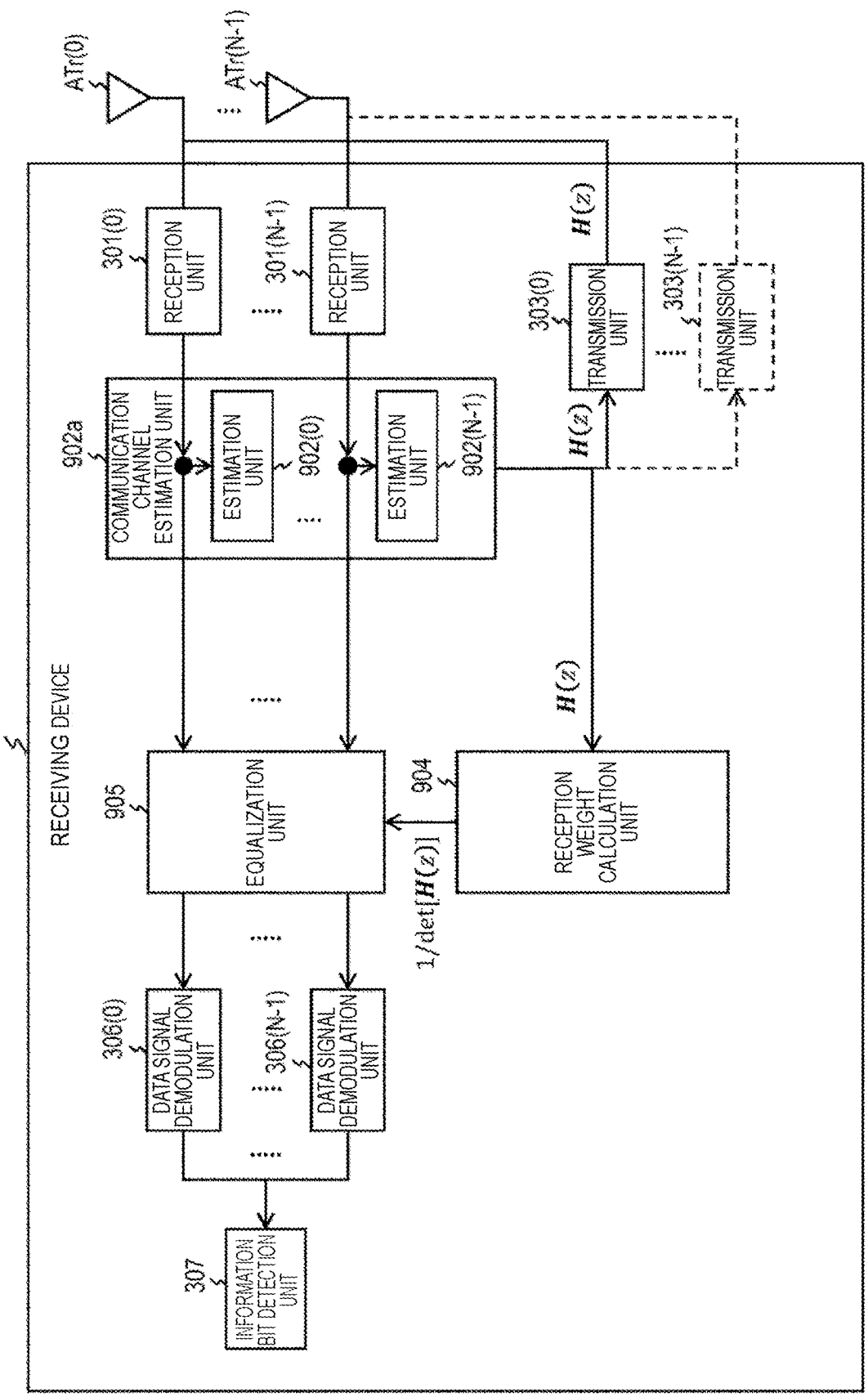
FIG. 6 is a diagram illustrating a configuration example of a receiving device according to a comparative example.

FIG. 6 illustrates a configuration example of the receiving device 802 according to a comparative example. In FIG. 6, the receiving device 802 includes a reception unit 301, a communication channel estimation unit 902a, a transmission unit 303, a reception weight calculation unit 904, an equalization unit 905, a data signal demodulation unit 306, an information bit detection unit 307, and antennas ATr(0) to ATr(N−1). In FIG. 6, blocks denoted by the same reference numerals as those in FIG. 4 operate similarly to those in FIG. 4. The transmission device according to the comparative example is assumed to be configured similarly to the transmission device 101 of FIG. 3.

The communication channel estimation unit 902a includes estimation units 902(0) to 902(N−1) respectively corresponding to the antennas ATr(0) to ATr(N−1). Each estimation unit 902 estimates the communication channel response based on the training signal transmitted from the transmission device 101 and acquires the communication channel matrix H(z). This process corresponds to the first estimation process in the above-described embodiment described with reference to FIG. 4. However, the communication channel estimation unit 902a does not perform the second estimation process performed by the communication channel estimation unit 302a in FIG. 4.

In the comparative example, the communication channel matrix H(z) acquired by the communication channel estimation unit 902a is transmitted to the transmission device 101 and is output to the reception weight calculation unit 904. Like the embodiment of FIG. 3, the communication channel matrix H(z) transmitted to the transmission device 101 is output to the transmission beam-forming unit 204 with adj[H(z)] calculated by the transmission weight calculation unit 207 of the transmission device 101 as a transmission weight.

On the other hand, the reception weight calculation unit 904 calculates det[H(z)] shown in the Expressions (3) and (4) as a reception weight based on the communication channel matrix H(z) input from the communication channel estimation unit 902a and outputs 1/det[H(z)] to the equalization unit 905.

Based on the determinant det[H(z)] output from the reception weight calculation unit 904, the equalization unit 905 performs the equalization process to remove intersymbol interference of the data signal of each stream received by the reception unit 301 using 1/det[H(z)] as a reception weight. When the equalization process is performed through FDE, the equalization process is performed by dividing the data signal converted into the frequency domain through the DFT by det[H(z)] converted into the frequency domain. Then, the equalized data signal in the frequency domain is converted into a data signal in the time domain through IDFT and is output to the data signal demodulation unit 306.

Thereafter, the data signal demodulation unit 306 and the information bit detection unit 307 operate similarly to the embodiment of FIG. 4.

Figure 7:
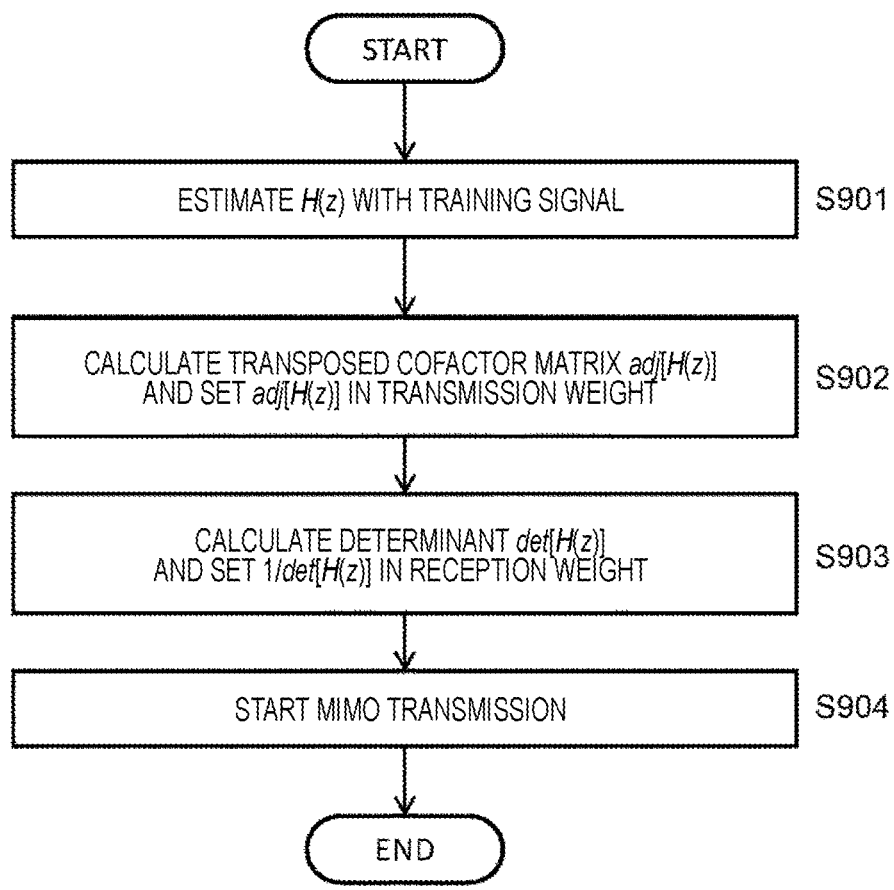
FIG. 7 is a diagram illustrating a flow of a process of a wireless communication system according to a comparative example.

FIG. 7 illustrates a flow of a process of a wireless communication system according to the comparative example. The process illustrated in FIG. 7 is performed by each block of the transmission device 101 and the receiving device 802 described in FIGS. 3 and 6.

In step S901, similarly to step S101 in FIG. 5, the estimation unit 902 of the receiving device 802 receives the training signal transmitted from the transmission device 101 and estimates the communication channel matrix H(z) between all the antennas. The estimated communication channel matrix H(z) is transmitted to the transmission device 101.

In step S902, as in step S102 in FIG. 5, the transmission weight calculation unit 207 of the transmission device 101 calculates the transposed cofactor matrix adj[H(z)] and sets adj[H(z)] in the transmission weight of the transmission beam-forming unit 204.

In step S903, the reception weight calculation unit 904 of the receiving device 102 calculates det[H(z)] based on the communication channel matrix H(z) used to calculate adj[H(z)] and sets 1/det[H(z)] in the reception weight of the equalization unit 305.

In step S904, the transmission device 101 and the receiving device 802 start communication of a data signal through MIMO transmission.

In this way, the receiving device 802 according to the comparative example calculates adj[H(z)] of the transmission weight and det[H(z)] of the reception weight based on the communication channel matrix H(z) acquired by the communication channel estimation unit 902a.

On the other hand, the receiving device 102 according to the embodiment described with reference to FIGS. 4 and 5 calculates adj[H(z)] of the transmission weight based on the communication channel matrix H(z) acquired through the first estimation process to perform the transmission beam-forming process, estimates the communication channel response for each stream after the interstream interference is removed through the second estimation process, and calculates the reception weight using the combined communication channel response obtained by combining the estimation results of the communication channel responses of the plurality of streams. As a result, since the accuracy of the estimation result of the communication channel response can be improved, an equalization process with higher accuracy can be performed than in the comparative example.

As described above, the wireless communication system, the wireless communication method, and the receiving device according to the present invention combine the estimation results of the communication channel responses for the streams in conformity with the SC-MIMO scheme of performing the FIR type transmission beam-forming process, and perform the equalization process on the reception signals of the respective streams based on the combined estimation results of the communication channel responses. Thus, it is possible to improve the accuracy of the estimation results of the communication channel responses.

REFERENCE SIGNS LIST

100 Wireless communication system
101 Transmission device
102 Receiving device
201 Information bit generation unit
202 Data signal modulation unit
203 Training signal generation unit
204 Transmission beam-forming unit
205 Transmission unit
206 Reception unit
207 Transmission weight calculation unit
301 Reception unit
302a, 902a Communication channel estimation unit
302, 902 Estimation unit
303 Transmission unit
304 Estimation result combination unit
305, 905 Equalization unit
306 Data signal demodulation unit
307 Information bit detection unit
904 Reception weight calculation unit
ATt, ATr Antenna

The invention claimed is:

1. A wireless communication system that performs wireless communication between a transmission device and a receiving device in conformity with an SC-MIMO scheme,
wherein the transmission device includes
a training signal generation circuit that generates a predetermined existing signal used for the receiving device to estimate a communication channel response, and
a transmission beam-forming circuit that forms a transmission beam for removing interstream interference with a transmission weight calculated based on the communication channel response estimated by the receiving device, and
wherein the receiving device includes
a communication channel estimation circuit that receives the existing signal and estimates a communication channel response between multiple antenna pairs to form a plurality of estimated channel matrices, where each antenna pair includes an antenna of the transmission device and an antenna of the receive device,
a combination circuit that combines the plurality of estimated channel matrices for each stream estimated with the existing signal from which the interstream interference has been removed, and
an equalization circuit that performs an equalization process of removing intersymbol interference for each stream with the reception weight calculated based on the communication channel responses combined by the combination circuit.

2. The wireless communication system according to claim 1, wherein the communication channel estimation circuit performs a first estimation process to calculate the transmission weight and then performs a second estimation process to calculate the reception weight.

3. The wireless communication system according to claim 2,
wherein the combination circuit calculates an average value of the communication channel responses for each stream estimated in the second estimation process, and
wherein the equalization circuit performs the equalization process of removing the intersymbol interference for each stream with the reception weight calculated based on the average value of the communication channel responses calculated by the combination circuit.

4. A wireless communication method of performing wireless communication between a transmission device and a receiving device in conformity with an SC-MIMO scheme,
wherein the transmission device performs
a training signal generation process of generating a predetermined existing signal used for the receiving device to estimate a communication channel response; and
a transmission beam-forming process of forming a transmission beam for removing interstream interference with a transmission weight calculated based on the communication channel response estimated by the receiving device, and
wherein the receiving device performs
a communication channel estimation process of receiving the existing signal and estimating a communication channel response between multiple antenna pairs to form a plurality of estimated channel matrices, where each antenna pair includes an antenna of the transmission device and an antenna of the receive device, a combination process of combining the plurality of estimated channel matrices for each stream estimated with the existing signal from which the interstream interference has been removed, and an equalization process of removing intersymbol interference for each stream with the reception weight calculated based on the communication channel responses combined in the combination process.

5. The wireless communication method according to claim 4, wherein, in the communication channel estimation process, after a first estimation process is performed to calculate the transmission weight, a second estimation process is performed to calculate the reception weight.

6. The wireless communication method according to claim 5, wherein, in the combination process, an average value of communication channel responses for each stream estimated in the second estimation process is calculated, and wherein, in the equalization process, the intersymbol interference is removed for each stream with the reception weight calculated based on the average value of the communication channel responses calculated in the combination process.

7. A receiving device that performs wireless communication with a transmission device in conformity with an SC-MIMO scheme, the receiving device comprising:

a communication channel estimation circuit configured to receive a predetermined existing signal used for estimating a communication channel response transmitted from the transmission device and estimate a communication channel response between multiple antenna pairs to form a plurality of estimated channel matrices, where each antenna pair includes an antenna of the transmission device and an antenna of the receive device;

a combination circuit configured to combine the plurality of estimated channel matrices for each stream estimated by an existing signal from which interstream interference transmitted by beam-forming from the transmission device has been removed; and an equalization circuit configured to perform an equalization process of removing intersymbol interference for each stream with a reception weight calculated based on the communication channel responses combined by the combination circuit.

8. The receiving device according to claim 7, wherein the communication channel estimation circuit performs a first estimation process to calculate a transmission weight used for beam-forming by the transmission device and then performs a second estimation process to calculate the reception weight.

\* \* \* \* \*